A. PETERSEN.
NUT LOCK.
APPLICATION FILED FEB. 16, 1917.
1,234,081.
Patented July 17, 1917.
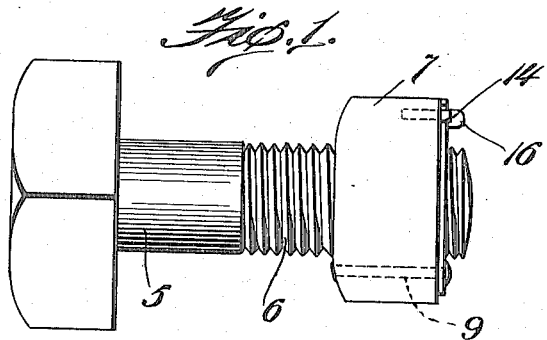
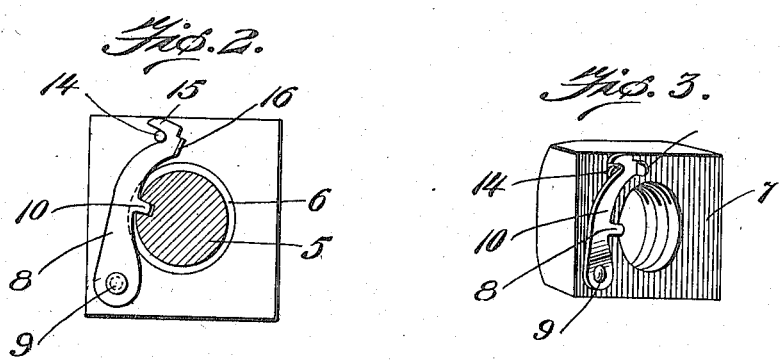
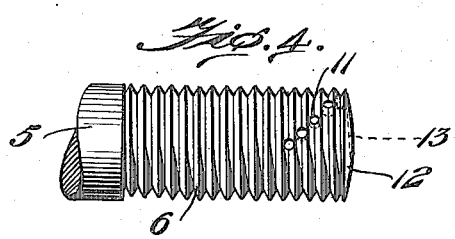
Inventor
Anders Petersen,
By Bradford & Doolittle,
Attorneys

UNITED STATES PATENT OFFICE.

ANDERS PETERSEN, OF SAN FRANCISCO, CALIFORNIA.

NUT-LOCK.

1,234,081. Specification of Letters Patent. Patented July 17, 1917.

Application filed February 16, 1917. Serial No. 148,995.

*To all whom it may concern:*

Be it known that I, ANDERS PETERSEN, a citizen of the United States, residing at San Francisco, San Francisco county, and State of California, have invented and discovered certain new and useful Improvements in Nut-Locks, of which the following is a specification.

My said invention relates to nut locks and consists in the combinations and arrangements of parts, as hereinafter described and particularly set forth in the accompanying claim.

The invention has for its purpose to provide a nut lock wherein the nut may be securely held to the bolt in any position in which it may be adjusted, and without requiring mutilation of either the nut or the bolt.

The invention has for its further purpose to provide a nut lock, in which the locking device *per se* as is carried on the nut, and one in which the locking elements may be applied to any nut or bolt as now manufactured, without appreciably altering their structure.

The invention is shown by way of illustration in the accompanying drawings, wherein—

Figure 1 is a side view of a bolt and nut with the invention applied thereto,

Fig. 2 an elevation of the nut and bolt showing the locking device on the nut and in engagement with the bolt, Fig. 3 a detail perspective view of the nut and locking pawl, and Fig. 4 a detail view showing the locking element on the bolt.

Referring more particularly to the drawings, 5 is an ordinary bolt of standard make, having the usual screw-threaded portion 6; and 7 designates the nut which is likewise of standard make and designed to be screwed on the threads 6 of the bolt.

The locking device consists of a pawl or dog 8 pivotally mounted on the pin 9 and secured to the nut adjacent one corner thereof, after the manner clearly shown in Figs. 2 and 3. The pivot pin 9 may pass entirely through the nut and be secured thereto by up-setting, or said pin may be mounted on the nut in any other desired manner.

The dog or pawl 8 is provided with a projection 10 adapted to engage with either one of a series of apertures 11, formed in the threaded portion 6 of the bolt 5, and said apertures are so arranged on the bolt that the projection 10 of the locking dog 8 will be in position to engage therein at each successive turn of the nut. It is proposed to arrange the several apertures 11 after the form of a spiral of one-half a convolution, and that the several apertures thereof extend for one-half the circumference of the bolt. The end 12 of the bolt is formed with a notch or other indentation 13 for marking the endmost aperture 11 of the series, and thus indicating, by feeling, where the holes may be found for setting the pawl in locking position.

The locking pawl is adapted to be secured in set position by means of a pin 14 that engages with the hooked end 15 of said pawl that is formed to provide a latch. And a finger-piece 16 is formed on the pawl adjacent the latch for manipulating said pawl, as will be understood.

In operation, the nut is applied after the usual manner, and during this adjustment, said pawl 8 is in retracted position and preferably rests with the latch 15 on top of the locking pin 14. When the nut has been properly adjusted, the latch is moved by the finger-piece 16 to bring the projection 10 into engagement with the proper aperture 11, and when thus positioned, the pin 14 engages with said latch after the manner shown in Fig. 2, when the nut and bolt are securely held against relative angular movement.

It is obvious that those skilled in the art may vary the details of construction and arrangement of parts without departing from the spirit of my invention, and I therefore do not wish to be limited to such features except as may be required by the claim.

Having thus fully described my said invention, what I claim as new and desire to secure by Letters Patent, is:—

In a nut lock, the combination of a bolt having a plurality of apertures formed in the threaded portion thereof and arranged in a spiral, a nut screw-threaded on said bolt, a pawl curved to the contour of the bolt and pivotally mounted at one end on said nut, said pawl provided with a member located substantially midway of its ends and adapted to engage in one of said apertures to secure the nut, a latch formed on the free end of said pawl, an angularly disposed hand-manipulating piece on said pawl adjacent said latch, and a pin on said nut adapted to engage with said latch to hold the pawl in locked position, substantially as set forth.

In witness whereof, I have hereunto set my hand and seal at San Francisco, California, this 10th day of February, A. D. nineteen hundred and seventeen.

ANDERS PETERSEN. [L. S.]

Witnesses:
W. N. CASEY,
F. M. HIFFERNAN.

Copies of this patent may be obtained for five cents each, by addressing the "Commissioner of Patents, Washington, D. C."